United States Patent [19]

Summo

[11] 4,350,649
[45] Sep. 21, 1982

[54] METHOD FOR CLOSING AN END OF A THERMOPLASTIC TUBE USING ULTRASONIC ENERGY

[75] Inventor: Arthur M. Summo, Londonderry, N.H.

[73] Assignee: Branson Ultrasonics Corporation, Newtown, Conn.

[21] Appl. No.: 213,416

[22] Filed: Dec. 5, 1980

[51] Int. Cl.³ .............................................. B29C 17/00
[52] U.S. Cl. .................................. 264/23; 74/1 SS; 310/325
[58] Field of Search ................... 264/23; 310/323, 325; 74/1 SS

[56] References Cited

U.S. PATENT DOCUMENTS

| | | | |
|---|---|---|---|
| 3,499,808 | 3/1970 | Obeda | 264/23 |
| 3,524,085 | 8/1970 | Shoh | 310/325 |
| 3,790,059 | 2/1974 | Jacke et al. | 156/580.1 |
| 3,824,138 | 7/1974 | Karobath et al. | 156/69 |
| 3,972,758 | 8/1976 | Bieber | 156/69 |

*Primary Examiner*—James B. Lowe
*Attorney, Agent, or Firm*—Ervin B. Steinberg; Philip J. Feig

[57] ABSTRACT

A method for closing an open end of a thermoplastic tube by applying ultrasonic energy to the end in a direction normal to the longitudinal axis of the tube. A horn adapted to undergo ultrasonic vibrations is provided and includes an open cavity disposed substantially at an antinodal region of longitudinal motion of the horn and oriented normal to the direction of longitudinal motion of the horn. The horn is rendered resonant along its longitudinal axis while the open end concomitantly is urged into the cavity in a direction normal to the direction of longitudinal motion of the horn thereby forming the end to the shape of the cavity.

6 Claims, 4 Drawing Figures

METHOD FOR CLOSING AN END OF A THERMOPLASTIC TUBE USING ULTRASONIC ENERGY

BRIEF SUMMARY OF THE INVENTION

The invention concerns a method for shaping or deforming a body, particularly the end of a tubular body, by high frequency vibratory motion. More specifically, this invention refers to a method for closing the end of a polymeric thermoplastic tubular body by the application of ultrasonic frequency vibrations in a direction substantially normal to the longitudinal axis of the tubular body.

The use of high frequency vibrations for forming or shaping a thermoplastic workpiece is well known in the art. For instance, in U.S. Pat. No. 3,972,758, entitled "Method of Forming over a Plastic Jacket against a Workpiece Using Vibratory Energy" issued to J. E. Bieber, dated Aug. 3, 1976 and in U.S. Pat. No. 3,824,138, entitled "Process and Apparatus for Joining a Tubular Thermoplastic Container Jacket, by Means of Ultrasonics, to a Thermoplastic End Cap to Form a Liquid-Tight Seal" issued to E. Karobath et al, dated July 16, 1974, there is disclosed forming over the end of a plastic jacket in order to assemble a tubular flash light battery by the use of high frequency vibrations, particularly vibrations in the ultrasonic frequency range. In both of these prior art methods and devices, the high frequency vibrations are applied in direction parallel to the longitudinal axis of the thermoplastic workpiece.

The present invention concerns the deforming of the end of a tubular thermoplastic body for providing a closure. In order to achieve a proper closure, a horn adapted to undergo ultrasonic vibrations at a frequency in the range between one and 100 kHz is provided and includes a cavity disposed in a side wall of the horn in a direction normal to the longitudinal axis of the horn. The cavity further is disposed substantially at an antinodal region of longitudinal motion of the horn.

In the present method, the end of the tube to be closed is urged by a static force into the cavity in a direction normal to the direction of travel of the longitudinal motion of the horn. The horn is then caused to vibrate at a high frequency thereby causing a softening and flowing of the thermoplastic material in the cavity concomitantly with the tube being urged into the cavity. The ultrasonic energy, therefore, is applied to the open end in a direction substantially normal to the longitudinal axis of the tube. Upon ceasing the high frequency vibratory motion of the horn, the softened and flowed material solidifies and conforms to the shape of the cavity. The present invention generally encompasses frequencies in the range between one and 100 kHz, preferably frequencies in the range between 16 and 60 kHz. The advantage of using ultrasonic vibrations in the forming and closing process arises from the fact that ultrasonic vibrations aid in the deforming of thermoplastic material by causing a softening and flowing of the thermoplastic material. The material solidifies soon after cessation of the ultrasonic vibrations. Moreover, as is known when using vibratory motion, the elastic recovery of thermoplastic material when the applied forming force is removed is greatly reduced, see the book "Ultrasonic Engineering" by Julian R. Frederick, John Wiley and Sons, Inc., New York, N.Y., 1965, page 170.

A principal object of this invention is, therefore, the provision of a new and improved method for closing the end of a tubular body.

Another important object of this invention is the provision of a method for closing the end of a tubular polymeric thermoplastic body using high frequency vibratory motion, particularly in the ultrasonic frequency range, applied substantially normal to the longitudinal axis of the thermoplastic tube.

Further and still other objects of this invention will be more clearly apparent by reference to the following description when taken in conjunction with the accompanying drawings.

DETAILED DESCRIPTION OF THE INVENTION

Figure 1:
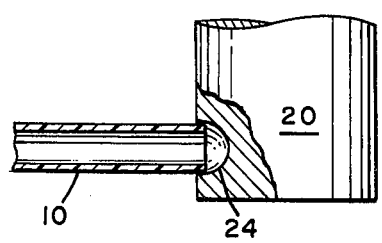
FIG. 1 is an elevational view, partly in section, of a tubular body being urged into a cavity in the horn prior to the application of ultrasonic energy.
Figure 2:
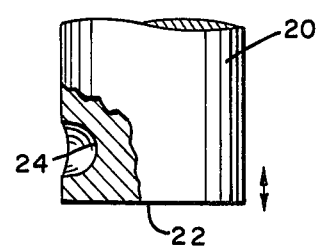
FIG. 2 is an elevational view, partly in section, of the cavity and horn providing the ultrasonic energy to the tubular body.

Referring now to the figures and FIG. 1 in particular, there is shown an open ended tubular body 10 made of polymeric thermoplastic material, the end of which is to be closed. In order to accomplish such closing, a high frequency resonator or horn 20 is provided and is constructed to be resonant at a predetermined frequency in the range between one and 100 kHz, such as at 20 kHz. The horn is dimensioned to be resonant as a half wavelength resonator at the frequency of sound traveling longitudinally therethrough thereby causing the output surface 22 to be located at an antinodal region of longitudinal motion; see FIG. 2. The horn 20 includes an open cavity 24 which is disposed in the side of the horn in a direction substantially normal to the direction of travel of the longitudinal vibrations traveling through the horn 20 when the horn is rendered resonant; the direction of travel of the longitudinal vibrations is shown by the double-headed arrow in FIG. 2. The cavity 24 further is disposed substantially at an antinodal region of longitudinal motion of the horn 20, i.e. near the output surface 22. The shape of the cavity, for example, may be concave hemispherically domed and preferably provides a limited slip fit for the tube urged therein. The shape of the cavity is not critical and may be of any geometric configuration such as a rectangular or tapered notch.

Figure 3:
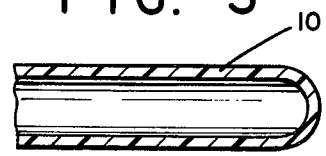
FIG. 3 is a cross-sectional view of a tubular body closed in accordance with the present method.

The open end of the tube to be closed is urged by force means (not shown) into the cavity in a direction normal to the direction of longitudinal motion of the horn. The amount of force is not critical. The horn 20 is then rendered resonant along its longitudinal axis at a predetermined frequency while the tube end concomitantly is urged into the cavity to thereby cause a softening and flowing of the thermoplastic material to conform to the shape of the cavity 24. When the desired degree of closing has been obtained, the vibratory motion of the horn 20 is stopped. However, for a brief dwell time the tube 10 is urged further toward the horn 20 thereby effecting solidification and formation of the plastic material. After a sufficient dwell time required to solidify the softened material, the tube 10 is withdrawn from the cavity 24 and the end of the tube is closed as shown in FIG. 3.

Figure 4:
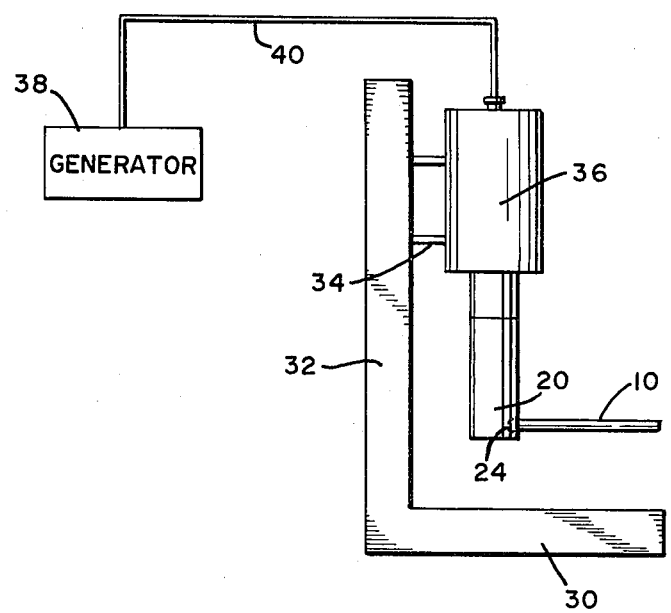
FIG. 4 is a schematic view of an apparatus useful for practicing the present invention.

Having described the process in some detail, reference is now made to FIG. 4 which discloses a typical apparatus for practicing the present invention. A base plate 30 is provided with an upstanding post 32 from which is suspended by suitable brackets 34 an electroacoustic converter unit 36. The converter unit 36 receives electrical high frequency energy from a generator 38 and converts the applied electrical energy to vibratory motion at the frequency of the applied electrical energy. The conversion of electrical energy to vibratory motion is accomplished by means of piezoelectric or magnetostrictive transducing means (not shown) disposed in the converter unit 36. The vibratory motion provided by the converter unit 36 is applied to the horn 20 which is mechanically coupled to the converter unit 36.

The apparatus shown schematically in FIG. 4 is described in greater detail in U.S. Pat. No. 3,790,059, issued to S. E. Jacke et al, dated Feb. 5, 1974, entitled "Ultrasonic Apparatus." The construction of the electroacoustic converter means 36 is shown typically in U.S. Pat. No. 3,524,085, issued to A. Shoh, entitled "Sonic Transducer," dated May 9, 1968. The design of horns is described in Frederick supra, pages 87 to 98.

DESCRIPTION OF THE OPERATION

The operation of the apparatus from FIG. 4 can now be visualized from the following description. The end of the tube 10 is urged by suitable force means (not shown) into the cavity 24 in a direction normal to the direction of longitudinal motion of the horn 20. The generator 38 is energized and provides high frequency electrical energy via a cable 40 to the converter unit 36, causing the horn 20 to become resonant and vibrate, typically at 20 kHz. Concomitantly with the vibrations of the horn, the open end of the tube is urged further into the cavity 24 thereby causing a softening and flowing of the thermoplastic material which conforms to the shape of the cavity. When the desired degree of closing has occurred, the generator 38 is deactivated thereby ceasing the vibrations of the horn. Following a brief dwell period, the tube is withdrawn from the cavity 24.

When closing an end of a $\frac{3}{8}$ inch diameter thermoplastic tube and utilizing a $\frac{3}{8}$ inch concave hemispherical cavity machined into a horn which vibrates at 20 kHz with a peak-to-peak amplitude of vibration of 0.005 inch to 0.008 inch maximum, the time for forming the closure is approximately one second.

It has been shown that the above described process is well suited for providing closures in thermoplastic tubes. Moreover, it will be appreciated by those skilled in the art that the tube 10 may be manually held and urged into the cavity 24 of the resonator 20 coupled to the converter unit 36 supported by a suitable stand. The generator 38 may be controlled by a foot switch actuated by the operator holding the tube 10. It will be understood further by those skilled in the art that a plurality of cavities may be disposed equidistantly around the horn so that the horn is balanced when resonant and a plurality of tubes may be closed simultaneously. Also, after one end of the tube is closed the other end also may be closed.

While there have been described and illustrated certain specific embodiments of the present invention, it will be apparent to those skilled in the art that various further changes and modifications can be made without deviating from the broad principle of the invention which shall be limited only by the scope of the appended claims.

What is claimed is:

1. A method for closing an open ended thermoplastic tube comprising:

providing a horn adapted to be rendered resonant along its longitudinal axis at a predetermined frequency of vibration, said horn having a cavity disposed substantially at an antinodal region of longitudinal motion of said horn and oriented substantially normal to the longitudinal motion of said horn;

urging the open tube end into said cavity in a direction normal to the direction of longitudinal motion of said horn;

rendering said horn resonant along its longitudinal axis at its predetermined frequency while concomitantly urging the open tube end into said cavity to cause a softening and flowing of the thermoplastic tube until the tube end is formed to the shape of said cavity;

ceasing rendering said horn resonant when the desired degree of closing has occurred, thereby causing solidification of the softened and flowed material, and withdrawing the closed tube from said cavity.

2. A method for closing an open ended thermoplastic tube as set forth in claim 1, wherein said cavity is hemispherical.

3. A method for closing an open ended thermoplastic tube as set forth in claim 1, wherein said predetermined frequency of vibration of said horn is between one and 100 kHz.

4. A method for closing an open ended thermoplastic tube as set forth in claim 1, wherein said predetermined frequency of vibration of said horn is 20 kHz.

5. A method for closing an open ended thermoplastic tube as set forth in claim 1, wherein said cavity is a rectangular notch.

6. A method for closing an open ended thermoplastic tube as set forth in claim 1, wherein said cavity is a tapered notch.

* * * * *